No. 647,690. Patented Apr. 17, 1900.
C. A. BAKER.
SLED.
(Application filed Feb. 25, 1899.)
(No Model.)
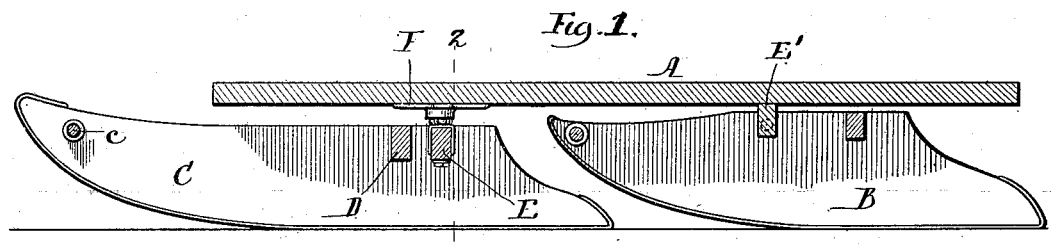
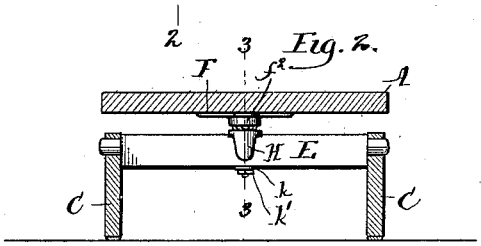
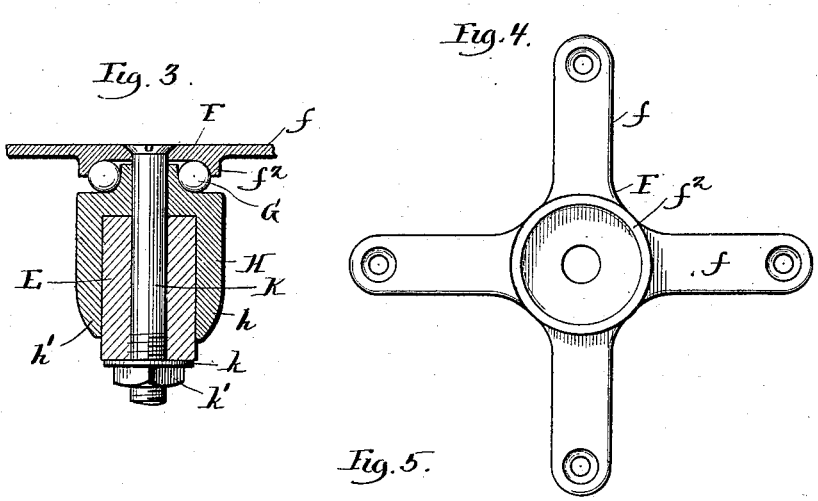
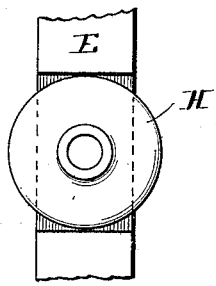
Witnesses:
Fred Gerlach
Katharine Gerlach.
Inventor:
Chas. A. Baker
By Price & Fisher
his Attorneys.
THE NORRIS PETERS CO., PHOTO-LITHO., WASHINGTON, D. C.

UNITED STATES PATENT OFFICE.

CHARLES A. BAKER, OF WAUKESHA, WISCONSIN.

SLED.

SPECIFICATION forming part of Letters Patent No. 647,690, dated April 17, 1900.

Application filed February 25, 1899. Serial No. 706,802. (No model.)

*To all whom it may concern:*

Be it known that I, CHARLES A. BAKER, a resident of Waukesha, county of Waukesha, State of Wisconsin, have invented certain new and useful Improvements in Sleds, of which the following is hereby declared to be a full, clear, and exact description.

The present invention relates more particularly to that class of sleds known as "bob-sleds," in which the front portion of the sled is supported by means of a pair of short runners pivotally connected with the body.

The invention is directed more especially to providing an improved construction of bob-sled designed for children's use in coasting; and the invention consists, primarily, in connecting the body of the sled to the front pair of runners by intermediate ball-bearings, so that the guiding of the sled may be quickly and easily effected.

The invention also consists in features of improvement hereinafter described, illustrated in the accompanying drawings, and particularly pointed out in the claims at the end of this specification.

Figure 1 is a view in central vertical longitudinal section through a sled embodying my invention. Fig. 2 is a view in vertical section on line 2 2 of Fig. 1. Fig. 3 is an enlarged detail view in vertical section on line 3 3 of Fig. 2. Fig. 4 is a detail inverted plan view of the upper bearing-plate. Fig. 5 is a detail plan view of the lower bearing-plate, showing part of the supplemental bolster.

A designates the seat or body part of the sled, the rear part of which is supported upon a pair of runners B, suitably connected thereto. The front part of the seat-board A, which extends to a considerable distance forward of the runners B, is supported upon the runners C, being connected with said runners through the medium of a ball-bearing, the preferred construction of which is hereinafter described. The runners C are shown as connected at their front ends by a rung or bar $c$ and as rigidly united near their rear ends by a bolster D. A supplemental bolster E serves as a mount for the ball-bearing, the opposite terminals of said bolster being journaled in the runners, preferably by rounding the ends to fit easily within holes formed in the runners.

The ball-bearing shown for uniting the front runners to the sled-body or seat-board comprises an upper bearing-plate F, having arms $f$ or like expanded part, through which pass the screws that unite the bearing-plate F to the under side of the seat-board A. About its center the under side of the plate F is formed with a channel $f^2$, adapted to receive the bearing-balls G, the depending flange or outer edge of the channel $f^2$ serving to retain the balls in place. Beneath the bearing-plate F is the companion plate H, against the upper surface of which the balls G will bear. The plates F and H are united together by a bolt K, and preferably this bolt extends through holes formed in both the plates F and H, and as well also through the bolster E, the lower threaded end of the bolt K being furnished with a washer $k$ and nut $k'$, whereby the plates are held in proper relation with respect to each other and upon the bolster. As shown, the bolt K has its head set within a countersunk recess in the upper face of the plate F, thereby permitting the plate to be secured firmly against the under face of the seat-board. The lower bearing-plate H is formed with depending front and rear arms or portions $h$ and $h'$, between which the bolster E fits, these arms serving to give great rigidity to the plate and guard against danger of breakage under the severe strains to which the bearing is necessarily subjected. By employing a ball-bearing between the front runners and the sled-body or seat-board the front runners can be quickly and easily shifted in order to guide the sled. The extended arms $f$ of the bearing-plate F permit this plate to be firmly fastened to the under side of the seat-board and at such distance from the center of strain that danger of breakage is effectually guarded against. By mounting the bolster E revolubly with respect to the runners the front runners are permitted to slide up and down over uneven surfaces, and thus relieve the sled from severe and sudden strains and jars. An additional bolster E', of like sort, is preferably attached to the rear member of the bob-sled. The seat-board rigidly fastens to the bolster E'; but of course the ball-bearing present at the front bob is dispensed with.

Having thus described my invention, what

I claim as new, and desire to secure by Letters Patent, is—

1. In a bob-sled the combination with the front runners having a cross bar or bolster uniting the same, of a bearing-plate secured beneath the seat-board or body, a companion bearing-plate secured upon said cross bar or bolster, bearing-balls held between said bearing-plates, and a pivot-bolt whereby said plates are connected together, said pivot-bolt passing through both of said bearing-plates and through said cross bar or bolster.

2. In a bob-sled the combination with the front runners having a bolster or cross-bar connecting them together, of a bearing-plate provided with extended arms secured beneath the seat-board or body, and having a downwardly-facing ball space or chamber at its center, a bearing-plate attached to said bolster, bearing-balls located between said bearing-plates and a pivot-bolt uniting said bearing-plates and passing through said bolster.

3. In a bob-sled the combination with the front runners having a perforated cross bar or bolster uniting the same, of a bearing-plate secured to the under side of the seat-board or body, a companion bearing-plate secured upon said cross bar or bolster and having arms extending downwardly at each side of said bolster opposite the perforations therethrough, bearing-balls interposed between said bearing-plates, and a pivot-bolt extending through said perforated cross bar or bolster and provided with a retaining-nut at its end, said bolt serving to unite said bearing-plates and said bolster.

4. In a bob-sled, the combination with a pair of front runners rigidly united by cross-bolster extended between them, of the supplemental bolster journaled at opposite ends in the runners and the seat-board sustained by upright pivot upon such supplemental bolster whereby the runners may rigidly shift both vertically and laterally without shifting the seat-board, substantially as described.

CHARLES A. BAKER.

Witnesses:
S. B. MORGAN,
W. E. BROWN.